United States Patent

Harata et al.

[11] Patent Number: 5,085,097
[45] Date of Patent: Feb. 4, 1992

[54] STEERING WHEEL CORE

[75] Inventors: Mitsuru Harata, Nagoya; Hiroshi Yasuda, Aichi, both of Japan

[73] Assignee: Toyoda Gosei Co., Ltd., Nishikasugai, Japan

[21] Appl. No.: 552,834

[22] Filed: Jul. 16, 1990

Related U.S. Application Data

[63] Continuation of Ser. No. 234,146, Aug. 19, 1988, abandoned.

[30] Foreign Application Priority Data

| Aug. 31, 1987 | [JP] | Japan | 62-217709 |
| Feb. 24, 1988 | [JP] | Japan | 63-41420 |
| Mar. 30, 1988 | [JP] | Japan | 63-42737[U] |
| Apr. 26, 1988 | [JP] | Japan | 63-103162 |

[51] Int. Cl.$^5$ .................. C22C 21/08; B62D 1/04
[52] U.S. Cl. ................................................. 74/552
[58] Field of Search ............... 420/533, 534, 546, 547; 74/552; 280/777

[56] References Cited

U.S. PATENT DOCUMENTS

| 3,237,480 | 3/1966 | Phelon | 74/552 |
| 3,856,360 | 12/1974 | Lindberg et al. | 420/534 |
| 4,062,704 | 12/1977 | Sperry et al. | 420/533 |
| 4,448,091 | 5/1984 | Bauer et al. | 74/552 |

FOREIGN PATENT DOCUMENTS

| 132650 | 2/1985 | European Pat. Off. | 420/534 |
| 2100437 | 8/1972 | Fed. Rep. of Germany | 74/552 |
| 3702847 | 8/1987 | Fed. Rep. of Germany | |
| 2518480 | 6/1983 | France | 74/552 |
| 45-31050 | 10/1970 | Japan | 420/534 |
| 48-38051 | 11/1973 | Japan | 420/534 |
| 58-63573 | 4/1983 | Japan | 74/552 |
| 59-192669 | 11/1984 | Japan | 74/552 |
| 60-82643 | 5/1985 | Japan | 420/534 |
| 341185 | 1/1931 | United Kingdom | 74/552 |
| 1210264 | 10/1970 | United Kingdom | 420/534 |
| 2058694A | 4/1981 | United Kingdom | 74/552 |

OTHER PUBLICATIONS

Japanese Industrial Standard UDC 669.715-143, Aluminium Alloy Die Castings, JIS H 5302—1976, pp. 1–5.

Primary Examiner—John J. Zimmerman
Attorney, Agent, or Firm—Cushman, Darby & Cushman

[57] ABSTRACT

A steering wheel core is disclosed which comprises a boss, a core piece of a ring part disposed around the boss, and core pieces of spoke parts interconnecting the boss and the core piece of the ring part. The core pieces of the spoke parts are formed by die casting an aluminum alloy containing magnesium, iron, manganese, silicon, and unavoidable impurities. The magnesium content in the aluminum alloy is not less than 1.5% by weight and less than 2.5% by weight.

4 Claims, 6 Drawing Sheets

STEERING WHEEL CORE

This is a continuation of application Ser. No. 07/234,146, filed Aug. 19, 1988 which was abandoned upon the filling hereof.

BACKGROUND OF THE INVENTION

This invention relates to a steering wheel core constructed so that at least the core pieces of the spoke parts extending between the boss and the core piece of the ring part are formed by die casting an aluminum alloy.

It has been proposed to form the steering wheel core by die casting an aluminum alloy for the purpose of decreasing the weight of the steering wheel and facilitating the production thereof.

Where the core pieces of the spoke parts interconnecting the boss and the ring part of the steering wheel are to be formed by die casting an aluminum alloy, the aluminum alloy to be used is desired to be of the type rich in extensibility in view of the performance the steering wheel core is required to exhibit. In all the six grades of die casting aluminum alloy (ADC1, ADC3, ADC5, ADC6, ADC10, and ADC12) designated by Japanese Industrial Standard (JIS), the grade ADC6 of rich ductility seems a feasible selection.

The adoption of ADC6, however, has not brought about fully satisfactory results.

SUMMARY OF THE INVENTION

It is an object of this invention to provide a steering wheel core which fulfils the required performance by forming at least the core pieces of the spoke parts interconnecting the boss and the core piece of the ring part with a novel die casting aluminum alloy.

The object described above is accomplished by a steering wheel core which comprises a boss, a core piece of a ring part disposed around the boss, and core pieces of spoke parts interconnecting the boss and the core piece of the ring part, which core pieces of the spoke parts are formed by die casting an aluminum alloy containing magnesium, iron, manganese, silicon, and unavoidable impurities, and which aluminum alloy has a magnesium content of not less than 1.5% by weight and less than 2.5% by weight.

The die casting aluminum of which the core pieces of the spoke parts are formed in the steering wheel of this invention exhibits highly desirable extensibility because the magnesium content thereof is in a prescribed range. Thus, the steering wheel core of this invention satisfactorily fulfils the expected performance as compared with the conventional countertype using the conventional aluminum alloy, ADC6.

Incidentally, magnesium is incorporated for the purpose of enhancing mechanical strength (such as, for example, tensile strength). If the magnesium content exceeds 2.5% by weight, however, the excess goes to lowering the extensibility. If the magnesium content is less than 1.5% by weight, the produced steering wheel core fails to satisfy the required performance in terms of mechanical strength.

In the aluminum alloy-contemplated by the present invention, when the manganese content is fixed in the range of 0.4% to 0.6% by weight, the iron content is desired to be not less than 0.4% by weight and not more than 1.0% by weight and the silicon content to be not less than 0.2% by weight and not more than 0.4% by weight.

When the manganese content is fixed in the range of 0.2% to 0.4% by weight, the magnesium content is desired to be not less than 1.5% by weight and not more than 2.4% by weight, the iron content to be not less than 0.3% by weight and not more than 0.8% by weight, and the silicon content to be not more than 1.0% by weight.

The reason for the addition of the various elements indicated above cannot be generally described on account of the contents of the elements. It may be portrayed as follows, however, for the formation of a general idea.

Manganese is added for the purpose of eliminating the adverse effect of the addition of iron manifested in formation of a needleshaped compound and consequent embrittlement of the produced aluminum alloy. If the manganese content is unduly large, the produced aluminum alloy is deficient in mechanical strength and unfit for use in the steering wheel core. If the manganese content is unduly small, the expected elimination of the adverse effect of the addition of iron cannot be obtained.

Iron is added for the purpose of preventing the aluminum alloy from sticking to a metal die during the course of die casting operation and enhancing the release of the aluminum alloy from the die. If the iron content is unduly large, it lowers the extensibility of the aluminum alloy. If the iron content is unduly small, the aluminum alloy is not released easily from the die.

Silicon is added for the purpose of improving the flowability of the aluminum alloy in a molten state during the course of die casting operation. If the silicon content is unduly large, it lowers the extensibility of the produced aluminum alloy.

DESCRIPTION OF THE PREFERRED EMBODIMENTS

Figure 1:
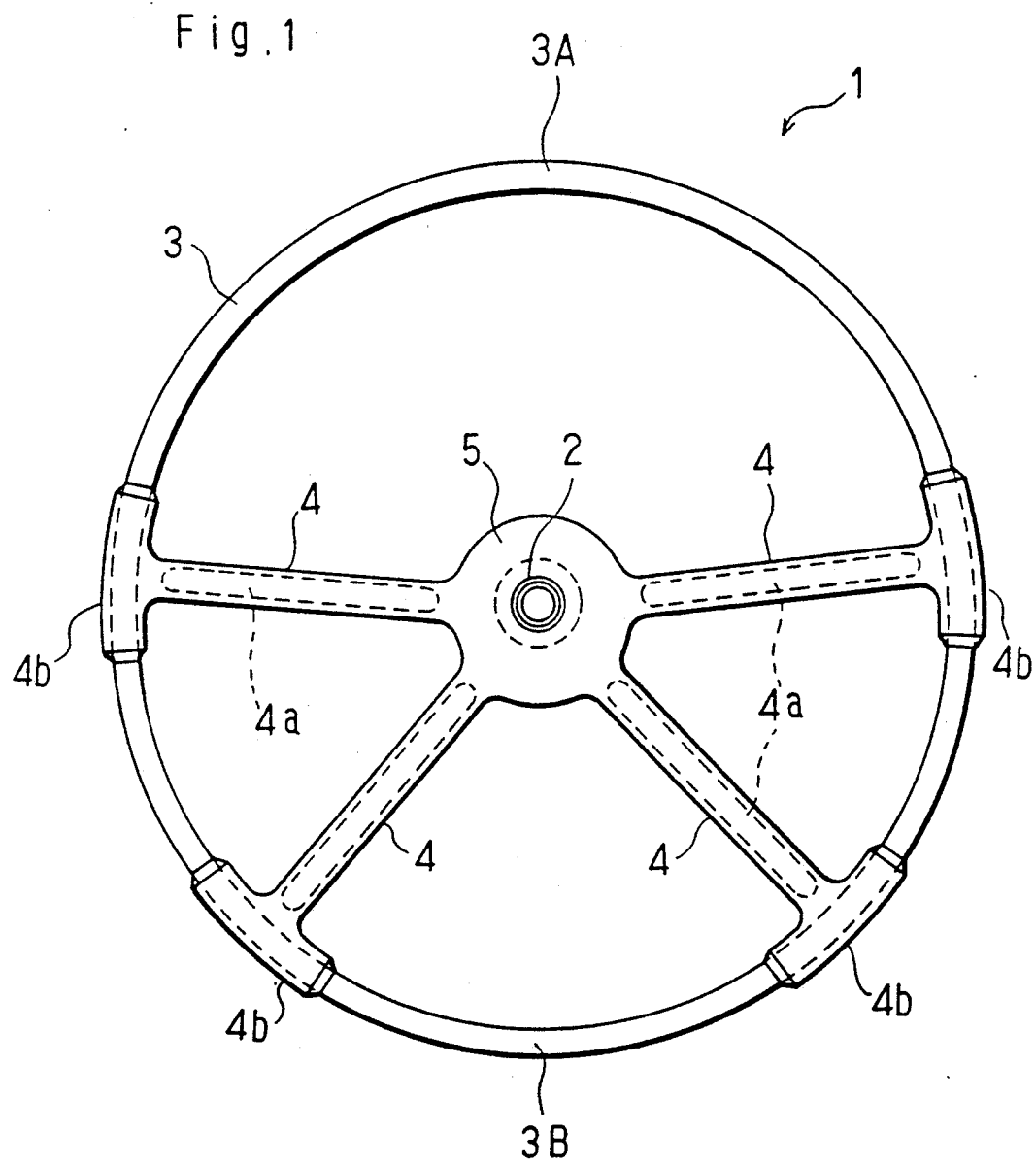
FIG. 1 is a plan view of a typical steering wheel core as one embodiment of the present invention.

Now, one embodiment of the present invention will be described below with reference to the accompanying drawings.

A steering wheel core 1 of this embodiment is such that four core pieces 4 of spoke parts interconnecting a boss 2 made of steel and a core piece 3 of a ring part made of steel pipe are formed of a die casting aluminum alloy.

The core pieces 4 of the spoke parts have a groove 4a formed on the bottom side and, therefor, have a cross section of the shape of the inverted letter U and are integrated on their boss 2 side with an annular boss connecting part 5 wrapped around the periphery of the boss 2 during the course of casing. On the ring parts' core pieces 3 side, they are provided with ring connecting parts 4b which have an annular cross section and are wrapped around the periphery of the core piece 3 of the ring part.

Of course, this steering wheel core 1 is produced by setting the boss 2 and the core piece 3 of the ring part in the metal die of a stated die casting machine and then integrating them with the core pieces 4 of the spoke parts by die casting.

The steering wheel core 1 of the present embodiment and a steering wheel core (comparative experiment) obtained by imitating the steering wheel core 1 of the embodiment, excepting the core pieces of the spoke parts were formed of the conventional aluminum alloy, ADC6, were subjected to a static load test. The results are shown in the graph of FIG. 2. This static load test was performed by a procedure comprising the steps of tilting the axis of the boss 2 forward at an angle of 30 degrees from the vertical direction thereby lowering the front side 3A of the core pieces 3 of the ring part and raising the rear side 3B thereof from the horizontal position illustrated in FIG. 1, then fixing the tilted boss 2, applying a varying load vertically on the rear side 3B of the core piece 3 of the ring part, measuring the displacement of the lower side 3B in the downward direction, and reporting the relation between the displacement and the load.

The contents of various elements in the core pieces 4 of the spoke parts in the steering wheel cores of Examples I and II and Comparative Experiment were shown in Table 1.

TABLE 1

| | Element (% by weight) | | | | | | | |
| --- | --- | --- | --- | --- | --- | --- | --- | --- |
| | | | | | Aluminum containing unavoidable impurities | | | |
| Kind | Magnesium (Mg) | Manganese (Mn) | Iron (Fe) | Silicon (Si) | Copper (Cu) | Zinc (Zn) | Nickel (Ni) | Aluminum (Al) |
| Example I | 2.06 | 0.52 | 0.54 | 0.26 | 0.05 | 0.05 | 0.01 | Balance |
| Example II | 2.23 | 0.36 | 0.41 | 0.54 | 0.02 | 0.01 | 0.01 | Balance |
| Comparative Experiment | 2.87 | 0.48 | 0.49 | 0.75 | 0.06 | 0.04 | 0.01 | Balance |
| ADC6 | 2.5~4.0 | 0.4~0.6 | 0.8 max. | 1.0 max. | 0.1 max. | 0.4 max. | 0.1 max. | Balance |

It is noted from this graph that the steering wheel core of the comparative experiment exhibited a small displacement of the core piece of the ring part and the steering wheel cores of Examples I and II enjoyed smooth plastic deformation of the core pieces of the spoke parts while exhibiting a displacement of about 80 mm of the core pieces of the ring parts and that the steering wheel cores of Examples I and II fulfilled the performance better than the steering wheel core of the comparative experiment.

The steering wheel cores 1 of Examples I and II possessed more desirable formability and deformation strength (elongation characteristic) than the steering wheel core using ADC6.

Figure 3:
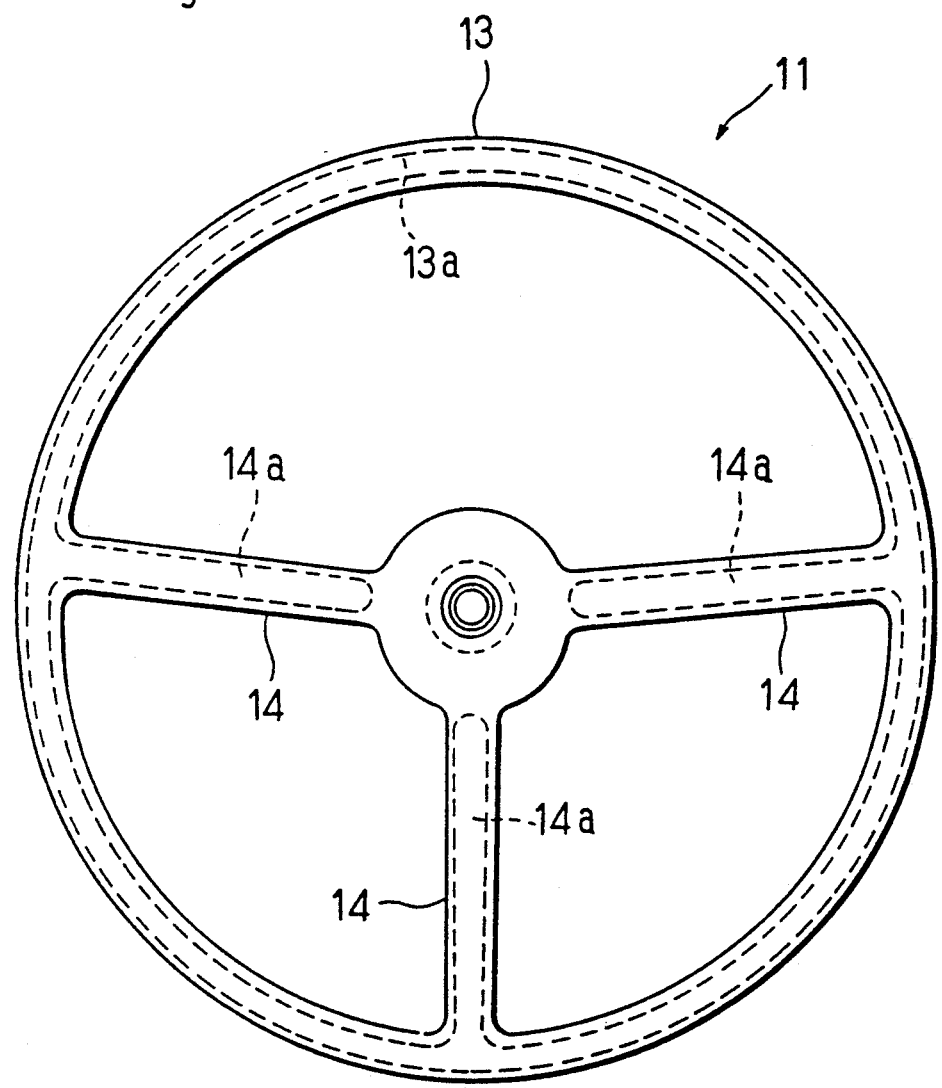
FIG. 3 is a plan view of a typical steering wheel core as one modification of the embodiment mentioned above.

The steering wheel core 1 of the embodiment has been described as having only the core pieces 4 of the spoke parts thereof formed by die casting an aluminum alloy of a prescribed composition. Optionally, it may have not only the core pieces 14 of the spoke parts but also the core piece 13 of the ring part formed by die casting the aluminum of the specific composition as illustrated in FIG. 3. Incidentally, in this steering wheel core 11, the core pieces 14 of the spoke parts and the core pieces 13 of the ring part have grooves 14a, 13a formed on the bottom side and possess a cross section of the shape of the inverted letter of U.

Figure 4:
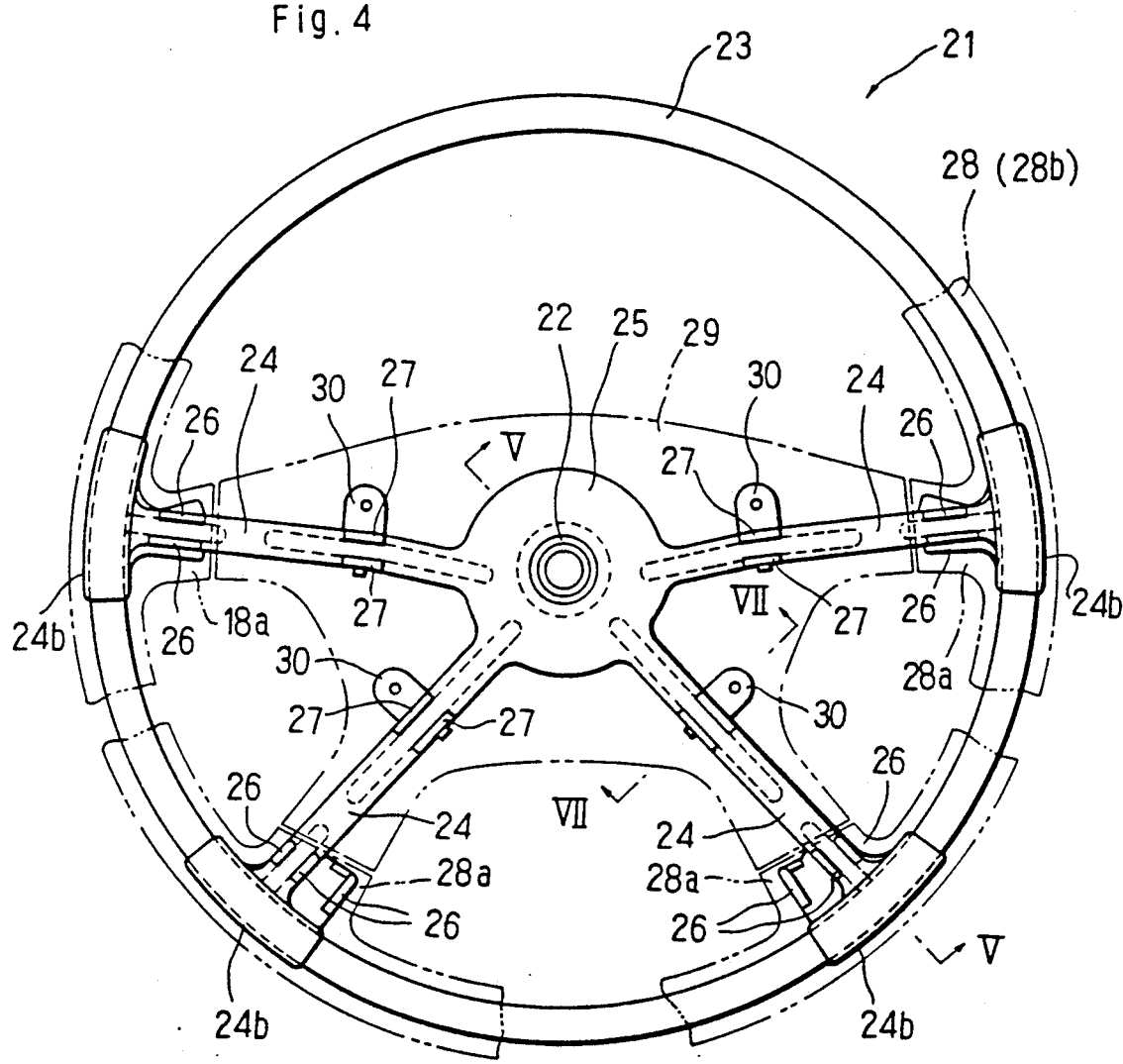
FIG. 4 is plan view of a typical steering wheel core as another modification of the embodiment mentioned above.

Otherwise, a steering wheel-gore 21 may be constructed as illustrated in FIG. 4.

Figure 2:
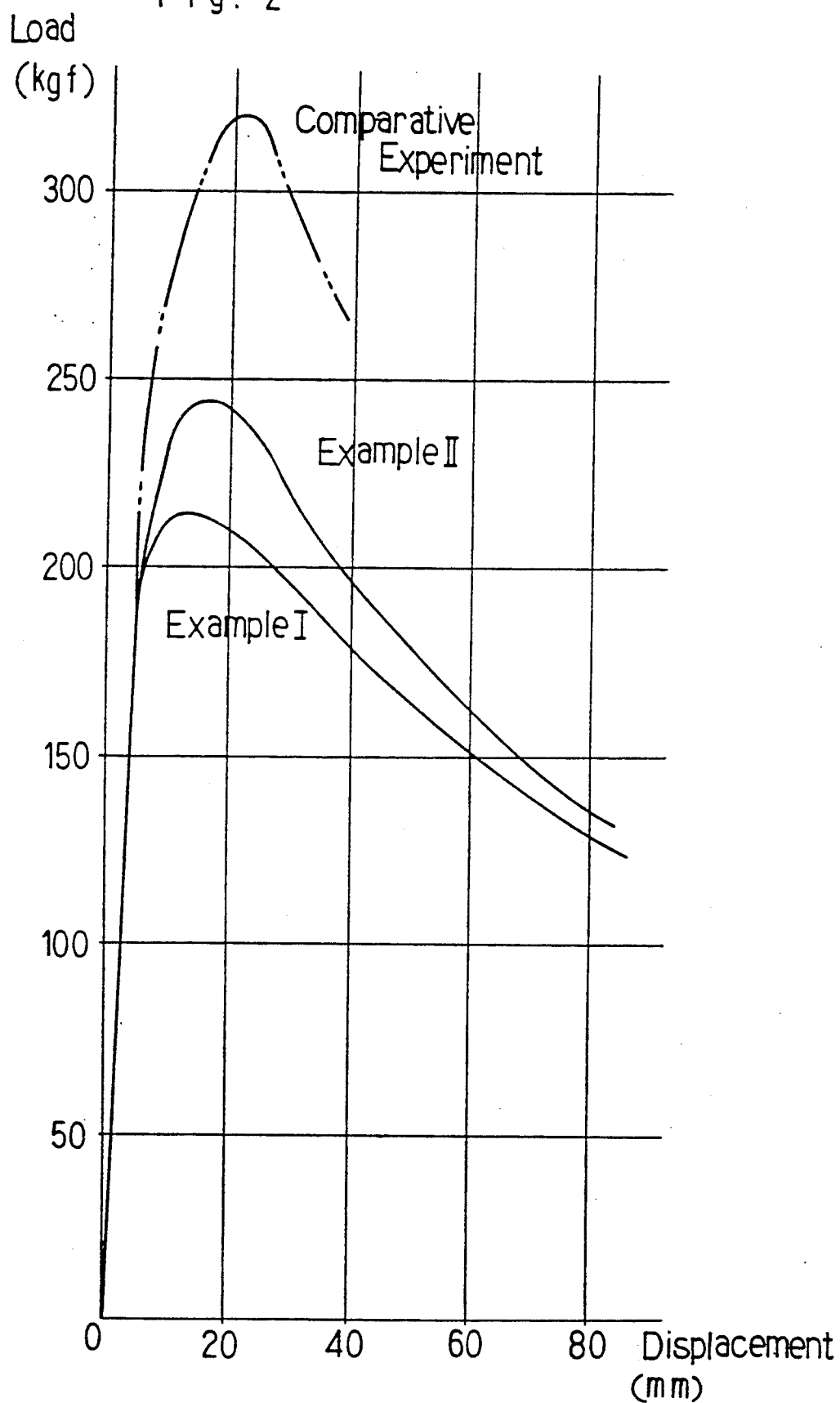
FIG. 2 is a graph showing the relation between the displacement and the load determined in a static load test using samples of working examples and a comparative experiment.

Similarly to the steering wheel core 1 illustrated in FIG. 1, this steering wheel core 21 comprises a boss 22 made of steel, a core piece 23 of a ring part, made of steel pipe, and four core pieces 24 of spoke parts interconnecting the boss 22 and the core piece 23 of the ring part and formed of the die casting aluminum alloy of the prescribed composition. Ribs 26 are formed one each near the ring connecting parts 24b of the core pieces 24 of the spoke parts. Ribs 27 are formed one each on the opposite lateral edges of the core pieces 24 of the spoke parts near the middle positions of the core pieces 24 of the spoke parts.

The ribs 26 are intended, when coating layers 28 of a flexible synthetic resin such as soft urethane or a rigid synthetic resin such as polypropylene are formed on the core piece 23 of the ring part through part of the core pieces 24 of the spoke parts, to curb the possibility that the spoke parts' side portions 28a of the coating layers 28 which have an increased wall thickness will shrink after the molding. Thus, the spoke parts' side portions 28a of the coating layers 28 formed by the molding are prevented from producing a sink mark or a weld mark.

Figure 5:
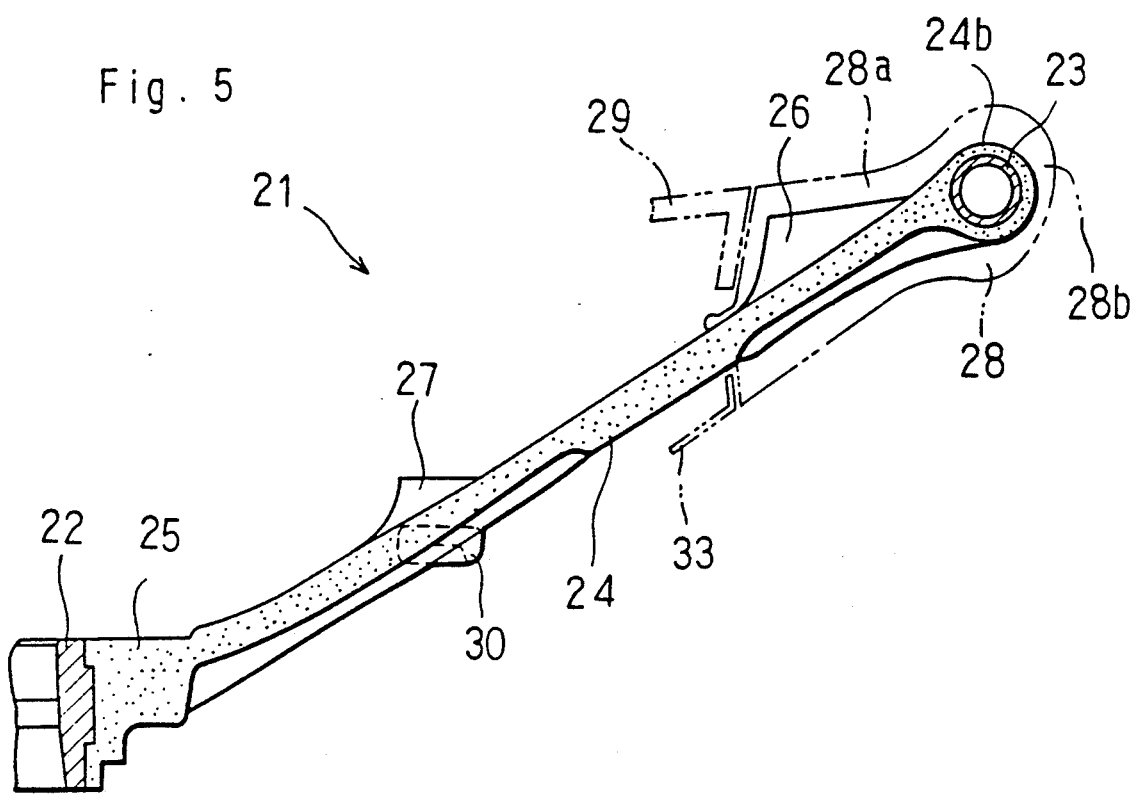
FIG. 5 is a cross section taken through FIG. 4 along the line V—V.
Figure 6:
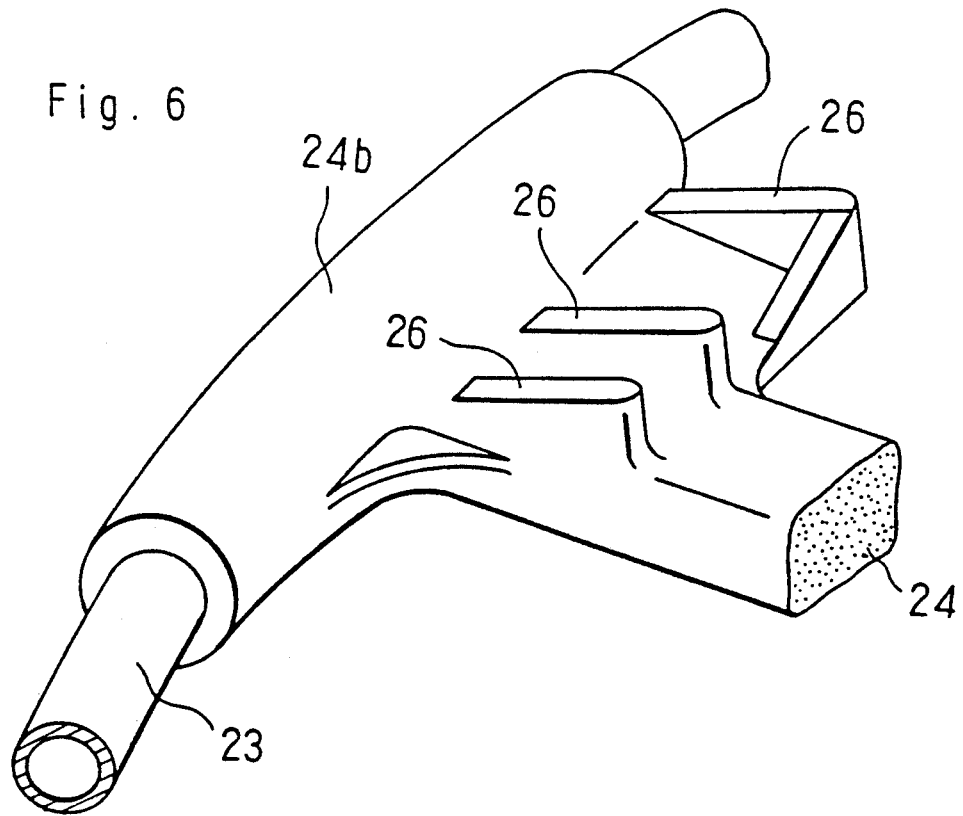
FIG. 6 is a perspective view illustrating part of the steering wheel core of FIG. 4.

The spoke parts' side portions 28a of the coating layers 28 have an increased wall thickness because the core pieces 24 of the spoke parts are disposed at a downward slant from the core piece 23 side of the ring part toward the boss 22 and the spoke parts' side portions 28a have substantially horizontal upper surfaces to generate the feeling of continuity with the upper surface of a pad 29 disposed on the boss 22 as illustrated in FIGS. 4 and 5.

Where the coating layers 28 are formed of a flexible synthetic resin, the ribs 26 substantially equalize the thickness of the spoke parts' side portions 28a on the ribs 26 and that of the ring part's side portions 28b and, therefore, enhance the feeling of manipulation of the steering.

Where the coating layers 28 are formed of a flexible synthetic resin and further covered with natural leather, for example, the ribs 26 ensure impartation of a shape-retaining property of some degree to the spoke parts' side portions 28a and, therefore, prevent the phenomenon that the sharp corners of the spoke parts' side portions 28a are dulled into smoothly rounded corners during the warping of the leather.

Figure 7:
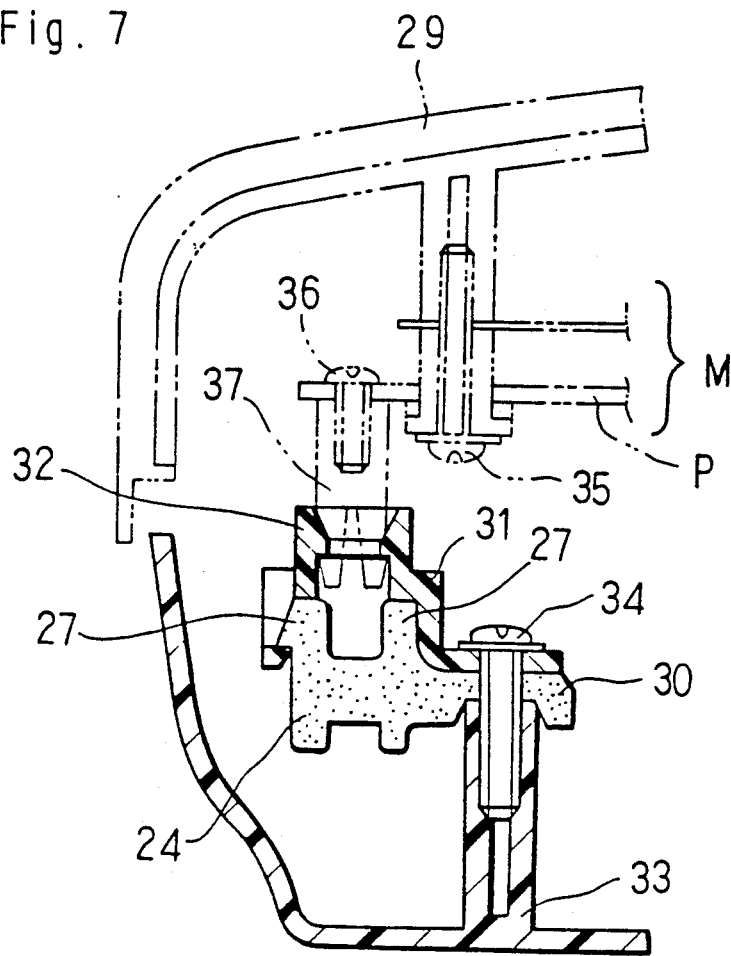
FIG. 7 is a cross section taken through FIG. 4 along the line VII-VII, illustrating the condition in which a pad fitting member is mounted on core pieces of the spoke parts of the steering wheel core illustrated in FIG. 4.
Figure 8:
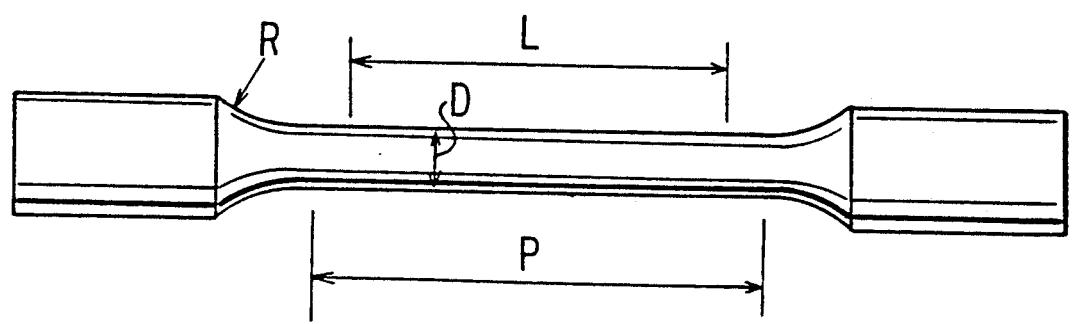
FIG. 8 is a diagram illustrating the shape of a test piece to be used in a tensile test.

The ribs 27, as illustrated in FIGS. 4, 5, and 7, are destined to form pedestals for the disposition of fitting members 31 made of a synthetic resin and used for fitting the pad 29 to the core pieces 24 of the spoke parts. The fitting members 31 are each provided with a joining tube 32 and fastened with a screw 34 to the fitting piece 30 projected from the lateral side of the core piece 24 of spoke part in conjunction with a lower cover 33. The joining tubes 32 are intended to take hold of engaging legs 37 which are fastened with a screw 36 to the pad 29 side. The symbol M denotes a horn switch mechanism to be fastened with a screw 35 to the pad 29. The symbol P denotes a stationary plate in the horn switch mechanism M.

These ribs 26, 27 are formed along the direction in which the core pieces of the spoke parts are formed. While the core pieces 24 of the spoke parts including the boss connecting parts 25 and the ring connecting parts 24b are formed by die casting, the molten aluminum alloy flows easily in the rib-forming recesses in the die and formation of ribs 26, 27 without entailing occurrence of any gas pocket. For the purpose of preventing the occurrence of a gas pocket during the molding and imparting sufficient strength to the formed ribs, the ribs are desired to have a thickness approximately in the range of 2 to 5 mm. If the intervals between the adjacent ribs 26 are unduly small, the ease of the release from the metal die is jeopardized and the sensation imparted to the hands taking hold of the coating layers 8 is spoiled. If they are unduly large, the spoke parts' side portions 28a produce a sink mark. Thus, the intervals are desired to be approximately in the range of 4 to 12 mm.

Test pieces of aluminum alloy containing the elements in different amounts were subjected to a tensile test. The results are shown in Table 2. The test pieces had a shape such that the distance L between the marks was 50 mm, the length P of the parallel portion was 60 mm, the diameter D was 8 mm, the radius of curvature R at the shoulder was 20 mm, the diameter at the opposite ends was 16 mm, and the overall length was 140 mm.

The tensile strength (kgf/mm,) represents the value obtained by drawing the opposite ends of a given test piece away from each other to find the largest load (kgf) endured by the test piece and dividing this largest load by the cross-sectional area (mm,) of the test piece in the parallel portion thereof.

The elongation (%) represents the value in percentage obtained by stretching a given test piece until rupture, finding the distance between the marks on the ruptured test piece, subtracting the initial distance L between the marks from the distance found on the ruptured test piece, and dividing this difference by the initial distance L.

TABLE 2

| Kind | Element (% by weight) | | | | | Tensile strength (kgf/mm$^2$) | Elongation (%) |
|---|---|---|---|---|---|---|---|
| | Mg | Mn | Fe | Si | Al containing unavoidable impurities | | |
| Test piece 1 | 1.5 | 0.6 | 0.6 | 0.2 | Balance | 18.54 | 14.91 |
| Test piece 2 | 2.0 | 0.4 | 1.0 | 0.4 | Balance | 20.25 | 12.29 |
| Test piece 3 | 1.8 | 0.5 | 0.7 | 0.3 | Balance | 19.95 | 14.18 |
| Test piece 4 | 2.3 | 0.3 | 0.6 | 0.2 | Balance | 19.01 | 13.62 |
| Test piece 5 (ADC6) | 2.9 | 0.5 | 0.5 | 0.8 | Balance | 23.5 | 10.3 |

It is clearly noted from the table that the test pieces 1, 2, 3, and 4 containing the indicated elements within the respective ranges defined by the present invention exhibited superiority in elongation by 30 to 50%, while betraying inferiority in tensile strength by 10 to 20%, to the test piece 5 of ADC6. The results indicate that the performance the steering wheel core is expected to exhibit can be fully satisfied by fixing the contents of the indicated elements within the respective ranges contemplated by this invention.

What is claimed is:

1. A steering wheel core, comprising
   (a) a boss,
   (b) a core piece of a ring part disposed around said boss, and
   (c) core pieces of spoke parts interconnecting said boss and said core piece of said ring part, said core pieces of said spoke parts are plastic-deformable being formed by die casting an aluminum alloy containing magnesium, iron, manganese, silicon, and unavoidable impurities.
   the content of said magnesium being not less than 1.5% by weight and less than 2.3% by weight based on the amount of said aluminum alloy,
   the content of said manganese being not less than 0.4% by weight and not more than 0.6% by weight based on the amount of said aluminum alloy,
   the content of said iron being not less than 0.4% by weight and not more than 1.0% by weight based on the amount of said aluminum alloy,
   and the content of said silicon being not less than 0.2% by weight and not more than 0.4% by weight based on the amount of said aluminum alloy.

2. The steering wheel core according to claim 1, wherein said core piece of said part is formed integrally with said core pieces of said spoke parts by die casting said aluminum alloy.

3. A steering wheel core, comprising
   (a) a boss,
   (b) a core piece of a ring part disposed around said boss, and
   (c) core pieces of spoke parts interconnecting said boss and said core piece of said ring part, said core pieces of said spoke parts are plastic-deformable being formed by die casting an aluminum alloy containing magnesium, iron manganese, silicon, and unavoidable impurities,
   the content of said magnesium being not less than 1.5% by weight and not more than 2.3% by weight based on the amount of said aluminum alloy, the content of said manganese being not less than 0.2% by weight and less than 0.4% by weight based on the amount of said aluminum alloy, the content of said iron being not less than 0.3% by weight and not more than 0.8% by weight based on the amount of said aluminum alloy, and the content of said silicon being not more than 1.0% by weight based on the amount of said aluminum alloy.

4. The steering wheel core according to claim 3, wherein said core piece of said part is formed integrally with said core pieces of said spoke parts by die casting said aluminum alloy.

* * * * *